(12) United States Patent
Westeroth

(10) Patent No.: US 8,614,944 B2
(45) Date of Patent: Dec. 24, 2013

(54) FAULT-TOLERANT SYSTEM FOR DATA TRANSMISSION IN A PASSENGER AIRCRAFT

(75) Inventor: Roman Westeroth, Schenefeld (DE)

(73) Assignee: Airbus Operations GmbH, Hamburg (DE)

( * ) Notice: Subject to any disclaimer, the term of this patent is extended or adjusted under 35 U.S.C. 154(b) by 574 days.

(21) Appl. No.: 11/993,726

(22) PCT Filed: Jun. 26, 2006

(86) PCT No.: PCT/EP2006/063539
§ 371 (c)(1),
(2), (4) Date: Jan. 15, 2010

(87) PCT Pub. No.: WO2007/000431
PCT Pub. Date: Jan. 4, 2007

(65) Prior Publication Data
US 2010/0115326 A1    May 6, 2010

(30) Foreign Application Priority Data

Jun. 27, 2005   (DE) .......................... 10 2005 030 073

(51) Int. Cl.
*H04L 12/26* (2006.01)
(52) U.S. Cl.
USPC ........................................................ 370/222
(58) Field of Classification Search
USPC .............................. 307/114; 385/24; 370/222
See application file for complete search history.

(56) References Cited

U.S. PATENT DOCUMENTS

| 4,774,514 | A | 9/1988 | Hildebrandt et al. |
| 6,577,419 | B1 | 6/2003 | Hall et al. |
| 7,573,691 | B2 * | 8/2009 | Pant et al. ...................... 361/111 |
| 2004/0052450 | A1 * | 3/2004 | Morrison ........................ 385/24 |

FOREIGN PATENT DOCUMENTS

| JP | 59014877 A | 1/1984 |
| JP | 05347631 A | 12/1993 |
| WO | 0115383 | 3/2001 |

OTHER PUBLICATIONS

Japanese Notification of Reason for Refusal dated Jun. 16, 2011.
German Examination Report dated Aug. 1, 2007.
German Examination Report dated Nov. 8, 2007.
Gardner R D et al, "PHONAV-a photonic WDM network architecture for next generation avionics systems" Aerospace Conference, 1999. Proceedings. Mar. 6, 1999, pp. 451-466, XP010350335, Piscataway, NJ, USA.

(Continued)

*Primary Examiner* — Chandrahas Patel
(74) *Attorney, Agent, or Firm* — Ingrassia Fisher & Lorenz P.C.

(57) ABSTRACT

A transmission system for transmitting communications data from at least one data source to a plurality of terminals via a distributor, includes terminals connected in series in a terminal chain, via an input port and an output port. The first and last terminals in the chain are directly interconnected with a shunt connection in such a way that the communications data in the chain of terminals is transmitted from terminal to terminal, between the first and the last terminals of the chain if all the terminals are interconnected, and, if the connection between the terminals in the terminal chain is interrupted, the communications data from the first terminal of the chain of terminals is transmitted in the terminal chain up to the inactive terminal and the communications data from the last terminal is transmitted in the terminal chain up to the inactive terminal.

3 Claims, 1 Drawing Sheet

(56) References Cited

OTHER PUBLICATIONS

Anderson D et al, "777 Optical LAN Technology Review", Electronic Components and Technology Conference, 1999. May 25, 1998, pp. 386-390, XP010293898, New York, NY, USA.

Johansson B S et al: "Flexible Bus: A Self-Restoring Optical ADM Ring Architecture", Electronics Letters, 1996, Bd.32, Nr.25, Dec. 5, 1996, pp. 2338-2339, XP000685328.

Cohen M D Ed- Institute of Electrical and Electronics Engineers, "A Proposed Local Area Network for Next Generation Avionic Systems", Proceedings of the National Aerospace and Electronics Conference, May 23, 1988, vol. 1, pp. 90-98, XP000812492, New York, NY, USA.

Gaska T D, "COTS Fibre Channel Network Technology Insertion into Avionics Systems", Proceedings of the National Aerospace and Electronics Conference, Jul. 13, 1998, pp. 120-127, XP010298905, Dayton, OH, USA.

Hudgins C E et al, "Applying Commercial Real-Time Data Networks to Future Military Avionics", Microprocessors and Microsystems, IPC Business Press LTD. Bd. 21, Nr. 1, Jul. 1997, pp. 21-28, XP004093362, London, GB.

Yoo D et al, "Multistage Ring Network: An Interconnection Network for Large Scale Shared Memory Multiprocessors", Journal of Systems Architecture, Elsevier Science Publishers BV., Bd. 46, Nr. 9, Jul. 2000, pp. 765-778, XP004205068, Amsterdam, NL.

International Search Report dated Sep. 7, 2006.

* cited by examiner

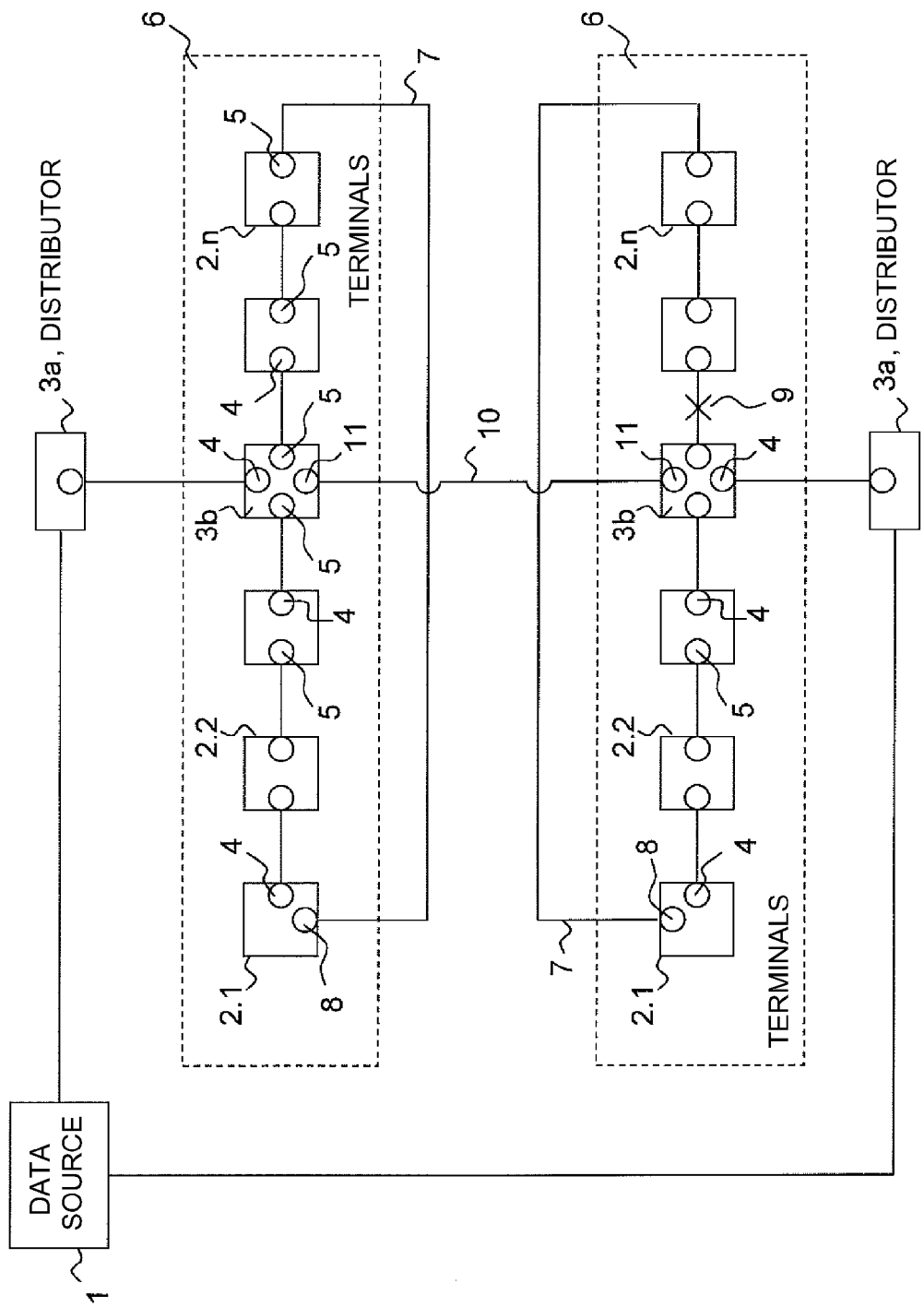

FAULT-TOLERANT SYSTEM FOR DATA TRANSMISSION IN A PASSENGER AIRCRAFT

CROSS-REFERENCE TO RELATED APPLICATIONS

This application is the National Stage of International Application No. PCT/EP2006/063539, filed on Jun. 26, 2006, which designated the United States of America, and which international application was published as WO Publication No. WO 2007/000431 A1 and which claims priority from German Application No. 10 2005 030 073.1, filed Jun. 27, 2005, and which is incorporated by reference in its entirety.

BACKGROUND

The disclosed embodiments relate to a communication system in a passenger aircraft, and in particular to a fault-tolerant transmission system for transmitting data from at least one data source to several terminals in the aircraft, according to the preamble part of claim 1.

Until now, in the case of in-flight entertainment (IFE) systems on board large aircraft the central electronics for providing passengers with entertainment programs etc. have been housed in one location. Such central electronics comprise at least one computer, modulators, digital media for storing, and various play units such as audio devices, DVD players etc. as well as a power supply and interface devices. The individual entertainment systems on the seats of the passengers are centrally controlled by the cabin crew by way of a control panel.

The individual seats in the aircraft comprise playback devices for the data from the central electronics, for example audio systems and displays, so that during the flight, each passenger can select from a large range of entertainment programs. These seat units are supplied by way of an on-board network. The on-board network is fed from the central electronics and comprises several distributors that if need be are associated with individual aircraft sub-units. Thus in an aircraft comprising several levels, one distributor for each deck can be provided. On one level of the aircraft, in the case of several seat rows arranged one behind the other, all the seats immediately one behind the other are supplied by a distributor.

In this distributor structure a first terminal is supplied by the distributor, and starting from the first terminal a second terminal is supplied; starting from the second terminal a third terminal is supplied etc.; so that a daisy chain of terminals results which are all supplied with data from the central entertainment system in the aircraft. However, if the connection between two terminals in this chain is interrupted, then inevitably the terminals arranged downstream are also cut off from the supply.

SUMMARY

It is the object of the disclosed embodiments to create a fault-tolerant transmission system that ensures the supply to the remaining terminals and components even in the case of failure of individual terminals and components.

This object is met by the communication system according to claim 1. Preferred exemplary embodiments of the disclosed embodiments form part of the subordinate claims.

A core idea of the disclosed embodiments consists of designing the transmission paths in the terminal chain so that they are redundant. In detail this means that at least one shunt is to be provided between the first and the last terminal in the terminal chain, by way of which shunt these two terminals are interconnected. Then, in the case where the terminal chain between the first and the last terminal is interrupted, the two half-chains between the first and the failed terminal, or between the last and the failed terminal, can be supplied from the direction of their respective end, i.e. from the direction of the first or of the last terminal. On the other hand, if all the terminals in the terminal chain function properly, no data is transmitted by way of the shunt connection.

The data transmission system according to the disclosed embodiments, for transmitting communication data from at least one data source to several terminals in a passenger aircraft by way of a distributor that is connected to the data source, wherein the terminals are daisy-chained in a terminal chain by way of an input port and an output port each, is characterised in that the first and the last terminal in the chain are directly interconnected by way of a shunt connection so that the communication data between the first terminal and the last terminal in the terminal chain is transmitted from terminal to terminal in the chain when all the terminals are interconnected, and so that the communication data from the first terminal in the terminal chain up to the inactive terminal, and from the last terminal in the terminal chain up to the inactive terminal, is transmitted when the connection between the terminals in the terminal chain is interrupted.

Preferably, each terminal and/or each distributor comprises a bypass switch through which in the case of a failure of the terminal the input port is connected to the output port.

In a further preferred embodiment of the disclosed embodiments the distributor comprises a bidirectional port by way of which the distributor is connected to the corresponding bidirectional port of the distributor of an adjacent terminal chain.

Meeting the objective in a manner according to the disclosed embodiments provides an advantage in that the implementation is easy and in that the failure probability of several terminals is significantly reduced.

Further characteristics and advantages of the disclosed embodiments are stated in the following description of exemplary embodiments, wherein reference is made to the drawing.

BRIEF DESCRIPTION OF THE DRAWINGS

FIG. 1 diagrammatically shows a first embodiment of the transmission system according to the disclosed embodiments.

DETAILED DESCRIPTION

FIG. 1 shows a transmission system for transmitting data for at least one entertainment program that comprises a data source 1 in which previously recorded entertainment programs are stored. By way of zone distributors 3a, which are located at central points in the aircraft (not shown), this data is transmitted to several terminals 2.1, 2.2 . . . , 2.n in the passenger aircraft. Transmission is such that the data from the data source 1, e.g. a local server, is fed to a zone distributor 3a. From the zone distributor 3a the data is transmitted to the area distributor 3b, and from the area distributor 3b the data is forwarded, by way of a data bus, to the terminals that are arranged on both sides of the area distributor 3b. The data is used for playback by the respective adjacent terminal, and/or is forwarded to the device that follows in the chain of terminals.

In detail, this means that when a passenger wishes to listen to music on one of the terminals, e.g. on terminal 2.2, the corresponding music data on the data bus is read in the terminal and is further processed in an audio unit (not shown) in the terminal 2.2. Furthermore, the data is output unchanged by the terminal 2.2 and is forwarded to the following terminal 2.1. The video data that is also present on the data bus is, for example, forwarded directly to the following terminal. In contrast to the above, in the post-connected terminal 2.1, for example, the video data with information about the weather at the destination of the aircraft is read, further processed and displayed to the passenger. The data is forwarded by the terminal to the following terminals, etc. For this purpose each terminal comprises an input port 4, by way of which it is connected to the upstream terminal, and an output port 5, by way of which it is connected to the downstream terminal. Overall this results in a daisy chain 6 of terminals.

In FIG. 1 below the first chain 6 that is connected to the first zone distributor 3a, a further chain 6 is shown that is connected to a second zone distributor 3a, wherein the second zone distributor 3a is also directly connected to the data source 1. The topology of the second chain 6 is basically identical to that in the first chain 6.

In the second chain at the bottom of FIG. 1 an interruption 9 between two devices has occurred. The interruption is indicated by two diagonal lines. In the hierarchy of data transmission as described above, this means that none of the terminals 2 that in the chain 6 are downstream of the interruption 9 when seen from the area distributor 3b can be supplied any longer. According to the disclosed embodiments, the terminal 2.n at the end of the chain 6 is therefore directly connected to the first terminal 2.1 by way of a shunt connection 7, wherein said terminal 2.1 apart from the first input port 4 comprises a second input port 8.

By means of the shunt connection 7 the data is directly transmitted from the first terminal 2.1, by way of its second output port 8 in the terminal chain 6, to the last terminal 2.n in the terminal chain 6. At the same time the data, as has been the case up to now, is transmitted from the first terminal 2.1, by way of its first output port 5, to the second terminal 2.2, from the second terminal 2.2, by way of its output port 5, to the third terminal 2.3 etc. up to the interruption 9 in the terminal chain 6. The terminals 2 that are situated downstream of the interruption 9 are now supplied, starting from the last terminal 2.n, in that said last terminal 2.n forwards the data, which it now receives by way of its output port 5, to the terminal 2.n–1 by way of its input port 4, whereupon said terminal 2.n–1 forwards the data to the terminal 2.n–2 etc. up to the interruption 9 in the terminal chain.

As an average person skilled in the art recognises, in this document the terms "input port" and "output port" are only used to indicate a direction, wherein normally the input port is upstream in the terminal, while normally the output port is downstream in the terminal. If a failure of a terminal occurs, this sequence can be reversed. In other words, in this document a port is understood to be a bidirectional port.

The shunt connection thus ensures that if the bus is interrupted at 9 nevertheless all the terminals 2.1, 2.2, . . . , 2.n continue to be supplied with data.

However, it is understood that in contrast to the above, when all the terminals are interconnected, the data between the first terminal 2.1 and the last terminal 2.n in the terminal chain 6 is transmitted from terminal to terminal in the chain. In other words, in this case the shunt connection 7 is redundant and is not used.

In a preferred embodiment of the disclosed embodiments each terminal 2.1, . . . , 2.n comprises a bypass switch through which in the case of a failure of the terminal the input port 4 is connected to the output port 5. In particular, the area distributor 3b also comprises such a bypass switch so that in the case of a failure of the area distributor 3b the input port 4 or the input ports 4 is/are short circuited to the output ports 5.

In order to maintain the supply to the terminal chains 6 even in the case of failure of one of the two zone distributors 3a, a preferred embodiment of the disclosed embodiments furthermore provides for a distributor connection 10 between the two area distributors 3b. To this effect the distributors 3b comprise a bidirectional connection port 11. By way of the connection port 11 data can be output and read in. Thus in the case of a failure of the area distributor 3b of a chain 6, the data received from the zone distributor 3a is output by the area distributor 3b of the adjacent chain 6 by way of the connection port 11 of said area distributor 3b. In the failed area distributor 3b this data is then directly forwarded, from the connection port 11, to the output port 5 so that the supply of the chain comprising the failed area distributor 3b continues to be ensured.

LIST OF REFERENCE CHARACTERS

1 Data source
2 Terminals 2.1, 2.2, . . . , 2.n
3 Distributor: 3a zone distributor; 3b area distributor
4 Input port of the terminal
5 Output port of the terminal
6 Terminal chain, 6a second terminal chain
7 Shunt connection
8 Shunt connection port in the terminal
9 SWitched-off terminal
10 Distributor connection
11 Connection port

The invention claimed is:

1. A transmission system for transmitting communication data from at least one data source to several terminals in a passenger aircraft by way of at least one distributor that is connected to the data source,
wherein each terminal by way of an input port and an output port is daisy chained to at least one terminal chain;
the first and the last terminal in each terminal chain by means of a shunt connection are directly interconnected so that the communication data between the first terminal and the last terminal in the terminal chain is transmitted from terminal to terminal in the chain when all the terminals are interconnected; and
the communication data from the first terminal in the terminal chain up to an inactive terminal and from the last terminal in the terminal chain up to the inactive terminal is transmitted when the connection between the terminals in the terminal chain is interrupted;
wherein the distributors of several terminal chains are interconnected by way of a distributor connection so that if the supply to one of the several terminal chains fails, by way of a distributor the respective chain is supplied by way of an adjacent distributor.

2. The transmission system according to claim 1, in which each terminal and/or each distributor comprises a bypass switch, through which in the case of failure of the terminal the input port is connected to the output port.

3. The transmission system according to claim 1, in which each of the area distributors comprises a bidirectional port, by way of which the zone distributor is connected to the corresponding bidirectional port of the area distributor of an adjacent terminal chain.

* * * * *